S. R. Warner,
Stop Cock,
Nº 47,073.     Patented Mar. 28, 1865.

Witnesses.
Rufus Sanford
John E. Earle

Inventor.
S. R. Warner

UNITED STATES PATENT OFFICE.

S. R. WARNER, OF NEW HAVEN, CONNECTICUT, ASSIGNOR TO HIMSELF AND A. R. TREADWAY, OF SAME PLACE.

IMPROVEMENT IN VALVES FOR STEAM-PIPES.

Specification forming part of Letters Patent No. 47,073, dated March 28, 1865.

*To all whom it may concern:*

Be it known that I, S. R. WARNER, of New Haven, in the county of New Haven and State of Connecticut, have invented a new and useful Improvement in Valves for Steam-Pipes; and I do hereby declare the following to be a full, clear, and exact description of the same, when taken in connection with the accompanying drawings and the letters of reference marked thereon, and which said drawings constitute part of this specification, and represent, in—

Figure 2:
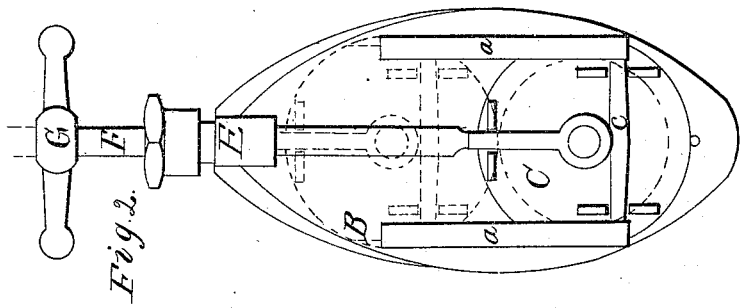
Figure 1:
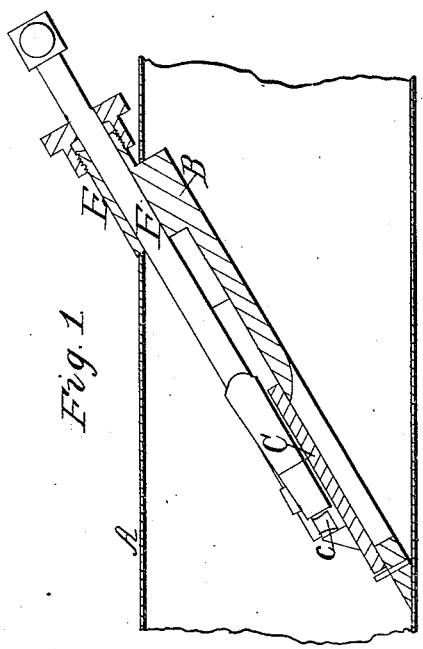

Figure 1, a central section of my valve fitted into pipe, and in Fig. 2 a face or top view.

My invention relates to improvements in valves for opening or cutting off the flow of steam, &c., in pipes, and is designed more particularly for tin pipes used for heating purposes. The common valves are expensive and require much more room than the diameter of the pipe—a very great inconvenience in many places. These difficulties have suggested my invention, which consists in constructing the valve plate or seat so that it may lie diagonally across the pipe, in form elliptical, and inclined sufficiently to allow the gate or valve to be opened within the circumference of the pipe.

To enable others skilled to construct and use my invention, I will proceed to fully describe the same as illustrated in the accompanying drawings.

A represents a section of tin pipe, such as in use for steam-heating purposes; B, the valve plate or seat of the form shown in Fig. 2, so as to lie diagonally across and fill the pipe A, as seen in Fig. 1. C is the valve or gate, fitted to slide on the said plate, to open or close, moving in guides *a* and held closely to the seat by a spring, *c*. One end of the valve-plate is constructed with a stuffing-box, E, around which the pipe is closely fitted. F is the valve rod attached to the valve C, and extends up through the stuffing-box E, as seen in Fig. 1, and terminating in a proper handle, G. It is more convenient, and I do insert this valve at the joint between two sections of pipe, and, when set in place in the pipe, I solder it to the pipe to secure it there; but the mode of securing it in pipes other than tin would readily suggest itself to those skilled in this class of work. No part of the valve projects beyond the surface of the pipe, except the stuffing-box and handle.

To open the valve, to permit steam or whatever it may be to pass through, draw up the valve by means of the handle G from the position in black, Fig. 2, to that in red, in which position the valve is fully open; to close it, simply reverse the operation.

Thus have I produced a valve opening to the capacity required, which does not extend beyond the surface of the pipe, and is a very great practical advantage over any other construction.

Having thus fully described my invention, what I claim as new and useful, and desire to secure by Letters Patent, is—

Constructing a valve-plate as described, so that it may be set in pipes in the manner and for the purpose specified.

S. R. WARNER.

Witnesses:
   RUFUS SANFORD,
   JOHN E. EARLE.